June 26, 1962   C. F. POSTEN ETAL   3,040,867
LEHR LOADER
Filed Oct. 27, 1959   6 Sheets-Sheet 1

INVENTORS
CARL F. POSTEN
GEORGE E. RUCK
BY Mason, Porter, Diller & Stewart
ATTORNEYS INVENTORS,
CARL F. POSTEN
GEORGE E. RUCK
BY Mason, Porter, Diller & Stewart,
ATTORNEYS June 26, 1962  C. F. POSTEN ETAL  3,040,867
LEHR LOADER
Filed Oct. 27, 1959  6 Sheets-Sheet 3
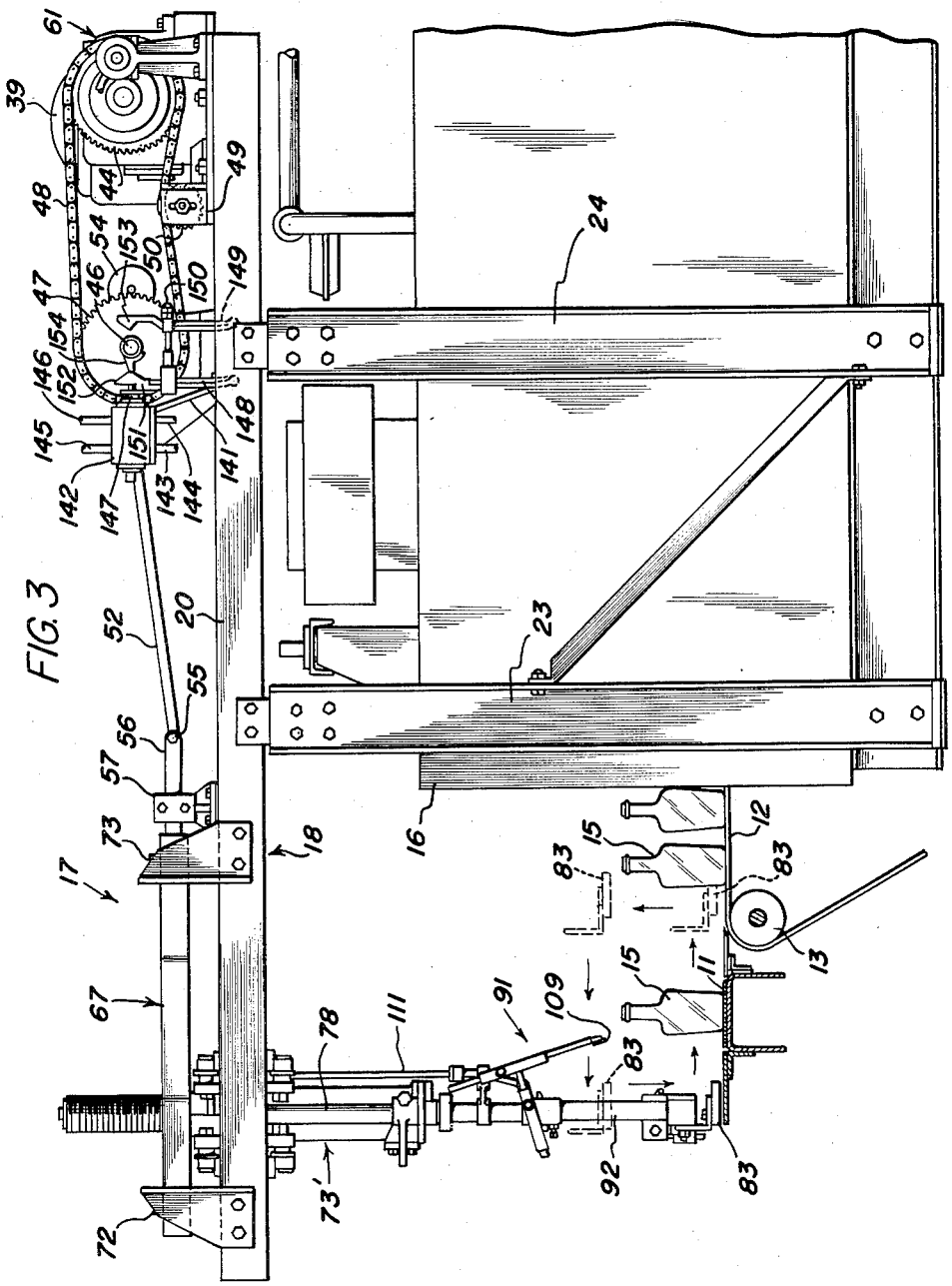
INVENTORS
CARL F. POSTEN
GEORGE E. RUCK
BY Mason, Porter, Diller & Stewart,
ATTORNEYS

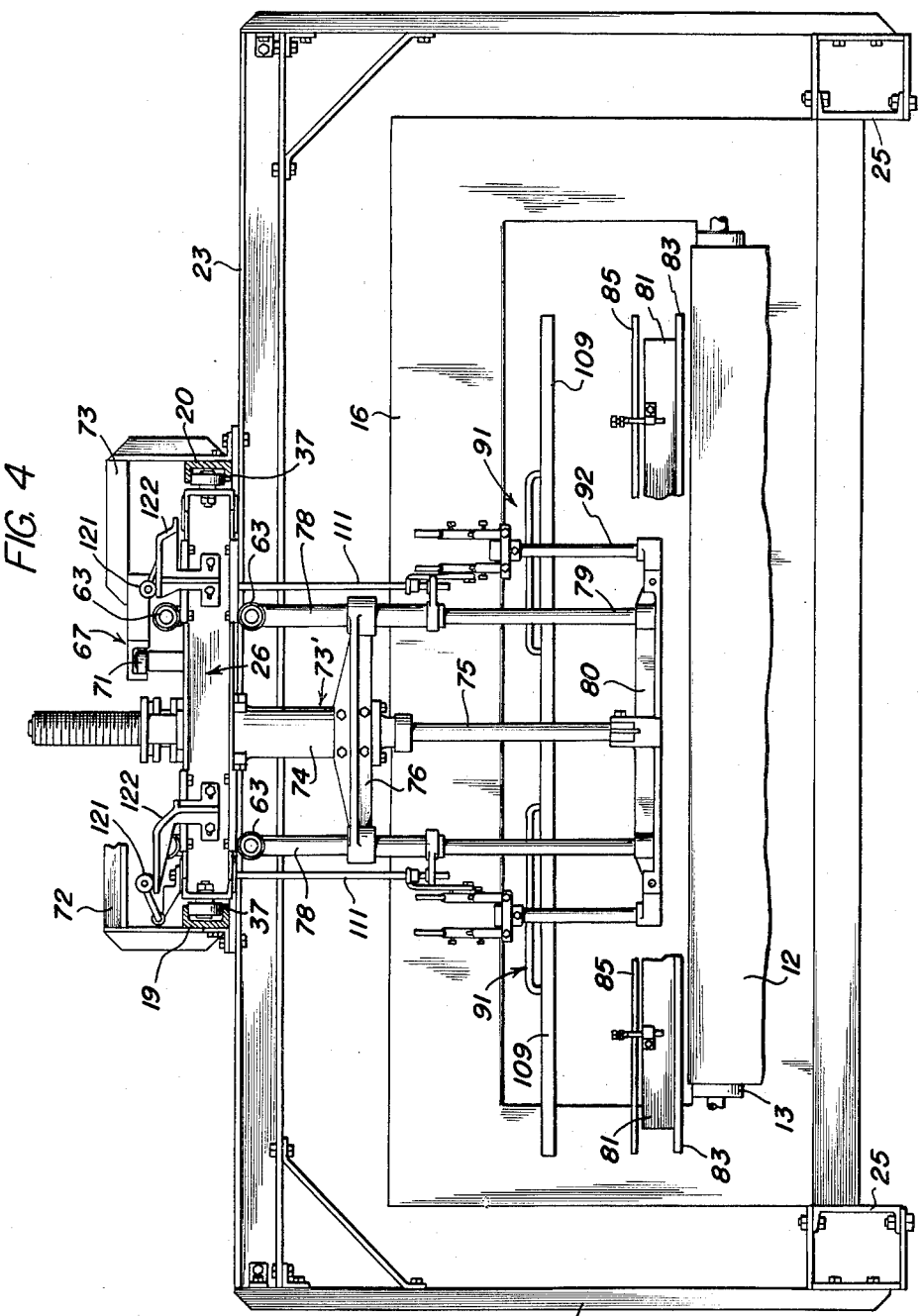

June 26, 1962 C. F. POSTEN ETAL 3,040,867
LEHR LOADER
Filed Oct. 27, 1959 6 Sheets-Sheet 5
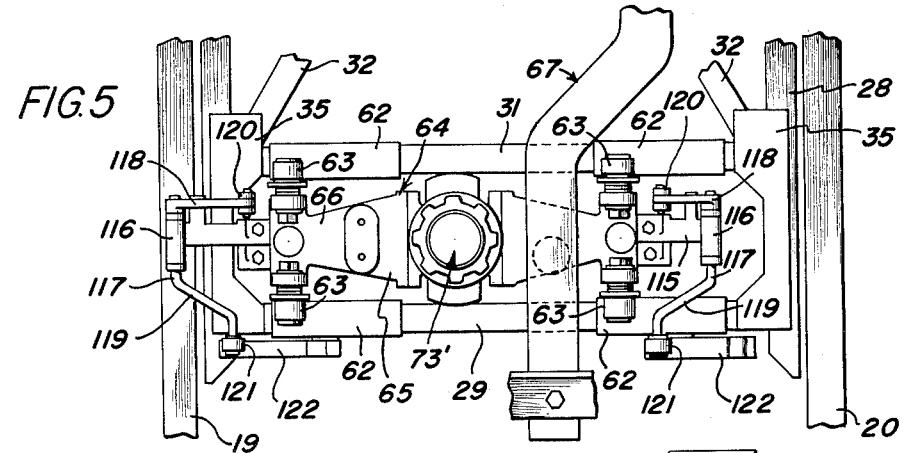
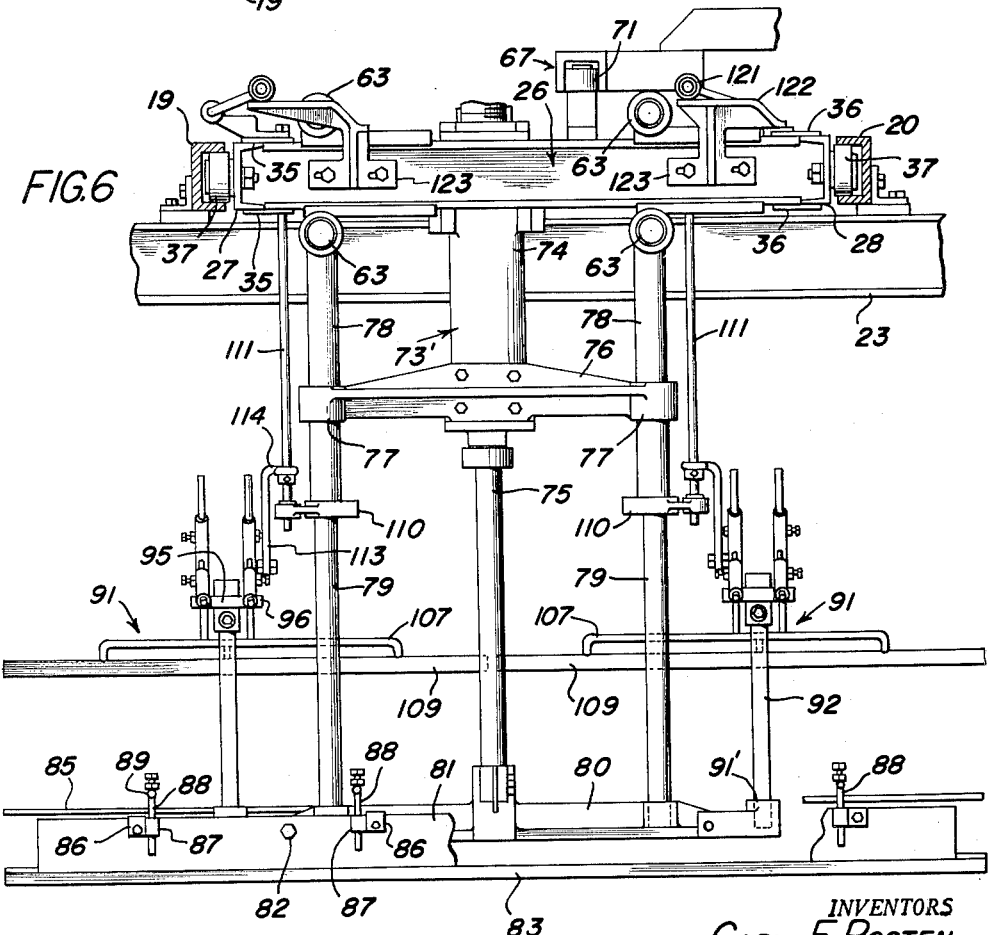
INVENTORS
CARL F. POSTEN
GEORGE E. RUCK
BY Mason, Porter, Diller & Stewart,
ATTORNEYS

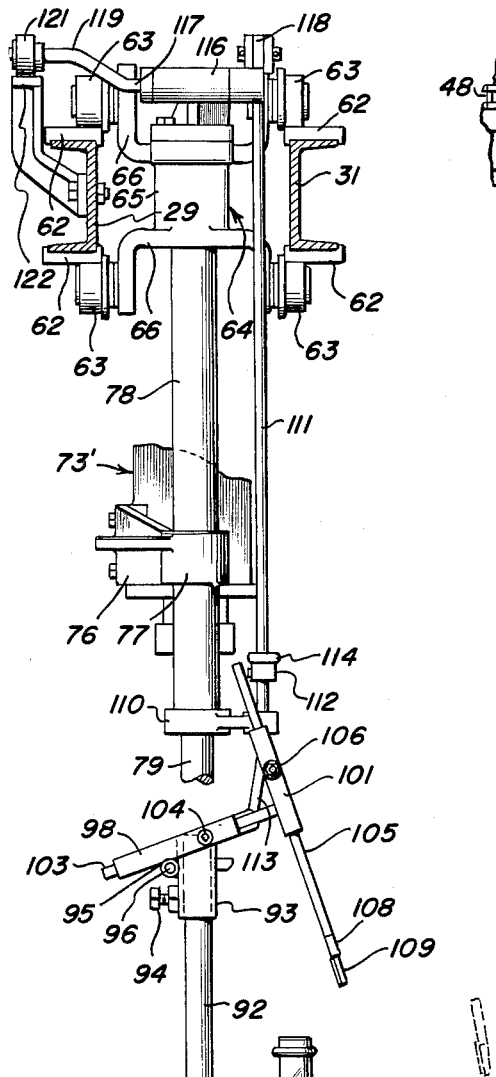
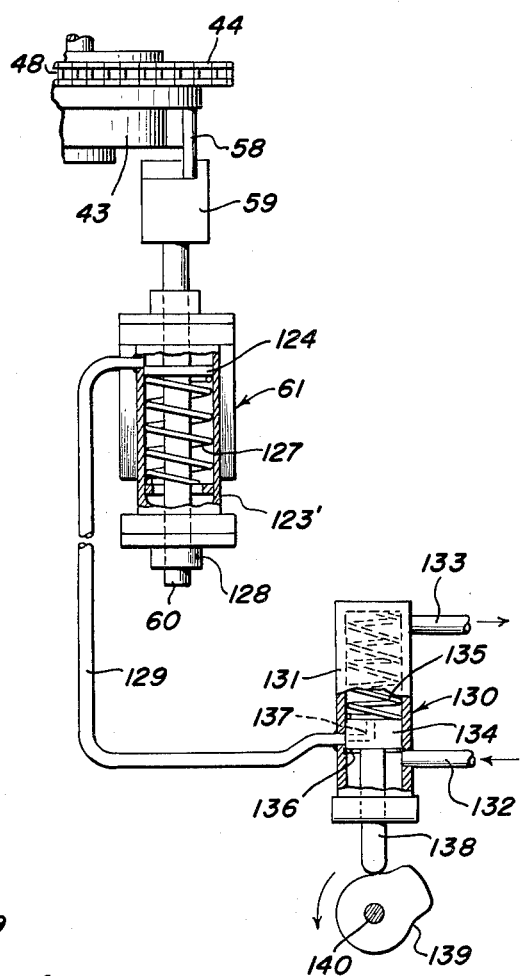
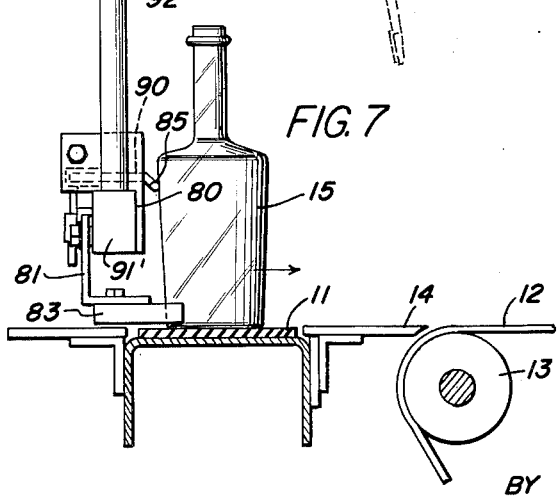
FIG. 7
FIG. 8
INVENTORS
CARL F. POSTEN
GEORGE E. RUCK
BY Mason, Porter, Diller & Stewart,
ATTORNEYS

United States Patent Office 3,040,867
Patented June 26, 1962

3,040,867
LEHR LOADER
Carl F. Posten, St. Clairsville, Ohio, and George E. Ruck, Wheeling, W. Va., assignors to Continental Can Company, Inc., New York, N.Y., a corporation of New York
Filed Oct. 27, 1959, Ser. No. 848,944
20 Claims. (Cl. 198—31)

The invention relates in general to new and useful improvements in article conveying apparatus, and more particularly relates to a conveyor system for transferring a plurality of articles disposed in a column on a single line conveyor from a glass article molding machine to a position in a row on a conveyor for a lehr.

After glass articles are molded, it is necessary that the glass of the articles be annealed, otherwise the glass articles will crack. This is accomplished by passing the molded glass articles through a lehr immediately subsequent to the molding operation. The lehr primarily consists of an elongated oven and a conveyor for moving the glass articles through the oven at a relatively slow speed. The glass articles exit from the glass molding machine on a single line conveyor at a relatively great individual rate. It is desired that these glass articles be transferred to the lehr conveyor arranged in rows and columns, with the spacing of the glass articles on the lehr conveyor being relatively exact so that the individual articles may be properly annealed and when the articles exit from the lehr oven, they may be readily transferred from the lehr conveyor for inspection and packaging purposes.

Another object of the invention is to provide an apparatus for transferring articles from a single line conveyor to a relatively wide conveyor, wherein a plurality of articles are simultaneously transferred and are deposited on the wide conveyor in a transverse row, the apparatus being of a nature that permits the transfer of a plurality of articles from the single line conveyor without the apparatus interfering with the subsequent movement of other articles along the single line conveyor even though the articles are closely spaced one after the other.

Still another object of the invention is to provide an apparatus for transferring articles closely spaced on a single line conveyor in a single file to a relatively wide conveyor which is disposed generally at right angles to the single line conveyor with a plurality of the articles being simultaneously transferred, the apparatus including an article engaging member which is moved generally normal to the direction of movement of the single line conveyor into engagement with the articles to be transferred, after which the article engaging member moves diagonally in the general direction of the movement of the single line conveyor until the article engaging member has cleared the next following article, after which the path of movement of the article engaging member and the articles carried thereby is again generally normal to the line of movement of the single line conveyor so that the articles on the single line conveyor may be continuously fed one after the other in closely spaced relation without interference even though the articles are pushed off of the single line conveyor onto the wide conveyor.

Another object of this invention is to provide a pusher type transferring mechanism for transferring articles from a single line conveyor to a relatively wide conveyor disposed generally normal to the single line conveyor, the apparatus including a pusher type article engaging member and means for moving the article engaging member first generally normal to the line of movement of the single line conveyor, then diagonally in the general direction of movement of the single line conveyor, next longitudinally of the wide conveyor and generally normal to the line of movement of the single line conveyor, after which the article engaging member is elevated and moved rearwardly and lowered to its starting position, the article engaging member in its elevated position moving above the subsequent articles on the single line conveyor.

A still further object of this invention is to provide an apparatus for transferring glass articles from a single line conveyor leading from a glass molding machine to a relatively wide lehr conveyor, the apparatus including a frame extending generally longitudinally of the lehr conveyor and having longitudinal rails on which the first carriage is mounted for reciprocatory movement, a second carriage carried by the first carriage for reciprocatory movement transversely of the direction of movement of the first carriage, drive means for reciprocating the first carriage, and guide means for reciprocating the second carriage in response to movement of the first carriage, and a support depending from the second carriage carrying a pusher type article engaging member, the support being in the form of an air motor of the extensible type which is operated in timed relation to the operation of the drive means for raising the article engaging member above the tops of articles in timed relation to the movement of the article engaging member. The fluid used to operate the fluid motor is air but hydraulic fluid may also be used if desired.

Yet another object of the invention is to provide a novel article transferring mechanism for pushing a plurality of articles off of a single line conveyor onto a relatively wide conveyor disposed at generally right angles to the single line conveyor, the apparatus including an article engaging member and stabilizing means cooperating with the article engaging member preventing the tipping of the articles during the pushing operation.

With the above, and other objects in view that will hereinafter appear, the nature of the invention will be more clearly understood by reference to the following detailed description, the appended claims, and the several views illustrated in the accompanying drawings.

In the drawings:

FIGURE 3 is a side elevational view of the apparatus of FIGURE 2, and shows the relationship thereof with respect to the single line conveyor and the lehr conveyor, the various positions of the article engaging member being shown in dotted lines.

FIGURE 4 is an end view of the article transferring apparatus, with the single line conveyor and portions of the article transferring apparatus being broken away for purposes of clarity.

FIGURE 5 is an enlarged fragmentary plan view showing the specific details of the two carriages and the movable elements carried thereby.

FIGURE 6 is an enlarged end view of the article transferring apparatus, and shows further the specific details of the mounting of the article engaging member and the article stabilizing means.

FIGURE 7 is an enlarged side elevational view of the support structure for the article engaging member and with the first of the carriages having portions thereof broken away and shown in section, the general details of the article stabilizers also being illustrated.

FIGURE 8 is a schematic view showing the details of the mechanism for operating the control clutch of the drive means.

Figure 1:
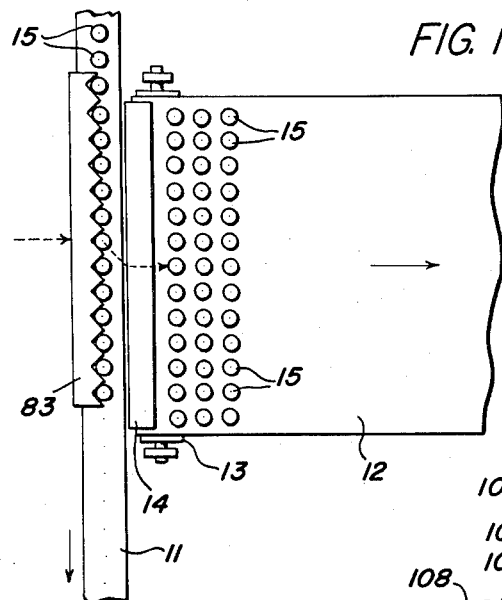
FIGURE 1 is a schematic view showing the relationship of the single line conveyor and the lehr conveyor, and the movement of articles from the single line conveyor to positions on the lehr conveyor.

In the embodiment of the invention illustrated in the drawings, the single line conveyor is referred to by the numeral 11, and the relatively wide lehr conveyor is referred to by the numeral 12. The details of the conveyors 11 and 12, with the exception of the fact that the lehr conveyor 12 is disposed generally normal to the single line conveyor 11 and terminates adjacent thereto, are immaterial. Accordingly, further description of these is believed to be unnecessary with the exception of the statement that the lehr conveyor 12 includes a roller 13 disposed adjacent to the single line conveyor 11. A dead plate 14 is disposed adjacent the end of the lehr conveyor 12 and is positioned intermediate the lehr conveyor 12 and the single line conveyor 11, the dead plate 14 extending between the two.

The single line conveyor 11 extends from a glass molding machine (not shown) and carries a plurality of articles to be transferred, the articles being referred to by the numeral 15 and being illustrated in FIGURE 7 as being in the form of a relatively tall bottle. The articles 15 are uniformly spaced along the single line conveyor 11 and are to be transferred from the single line conveyor 11 to the lehr conveyor 12. It is the intention of the invention that a plurality of the articles 15 be simultaneously pushed from the single line conveyor 11 across the dead plate 14 and onto the lehr conveyor 12. The number of articles to be transferred in one movement is preferably that sufficient to constitute a complete row of articles transversely of the lehr conveyor 12.

The lehr conveyor 12 is a part of a lehr which is used for annealing the glass articles after they have been formed by the article molding machine. In the annealing of the glass articles, the glass articles are generally heated to a temperature above the strain relief temperature of the articles, after which they are cooled under controlled conditions. To this end, the lehr also includes an oven 16 through which the lehr conveyor 12 passes. The oven 16 is generally illustrated in FIGURES 3 and 4 in particular.

The single line conveyor 11 and the lehr conveyor 12 may be considered elements of any type of article conveying system, although the normal usage thereof would be in conjunction with the transfer of articles from an article molding machine to a lehr. It is the intention of this invention that the individual articles be pushed from the single line conveyor onto the relatively wide conveyor, and to this end, there has been provided an article transferring apparatus, generally referred to by the numeral 17. The article transferring apparatus 17 includes an elongated frame 18 which is mounted above the single line conveyor 11 and the lehr conveyor 12. The frame 18 also extends above the oven 16.

The frame 18 is formed primarily of a pair of longitudinal frame rails 19 and 20 which are connected at their left ends by a transverse frame member 21 and at their right ends by a plate 22. The frame rails 19 and 20 are supported intermediate their ends by a pair of inverted U-shaped supports 23 and 24 which extend up, over and around the oven 16. The general structure of the supports 23 and 24 is best illustrated in FIGURE 4. It is to be noted that the supports 23 and 24 are supported from longitudinal frame members 25 of the oven 16. However, the supports 23, if desired, may extend to the floor below the oven 16.

Figure 2:
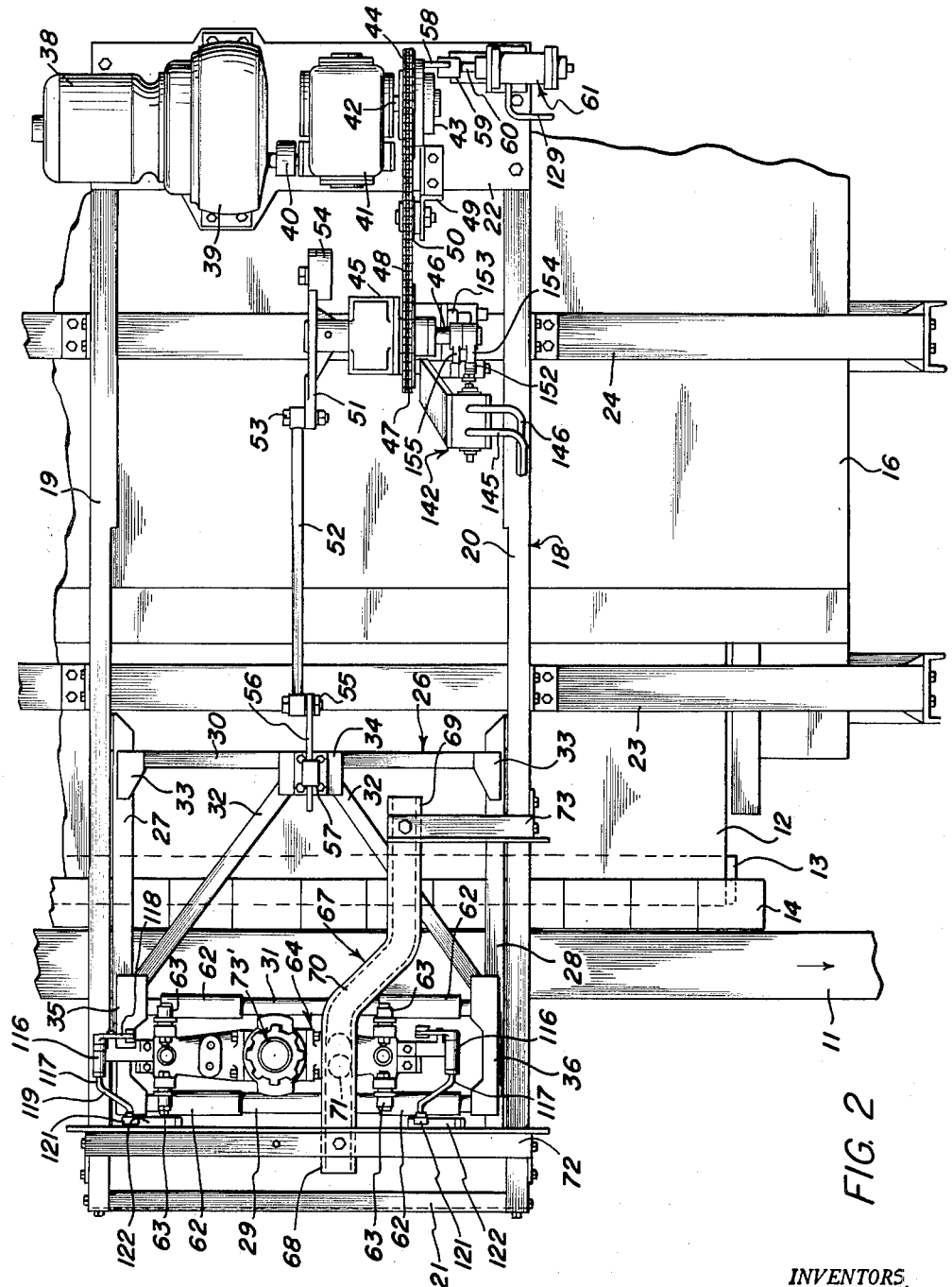
FIGURE 2 is a plan view of the article transferring system, and shows the specific details of the apparatus thereof.

As is best illustrated in FIGURE 6, the frame rails 19 and 20 are of a channel cross-section and are disposed in opposed open relation. The two frame members 19 and 20 function as rails for a first carriage, generally referred to by the numeral 26. The carriage 26 is generally rectangular in outline, as is best illustrated in FIGURE 2, and includes a pair of longitudinal frame members 27 and 28 which are interconnected at their ends by a pair of transverse frame members 29 and 30. An intermediate transverse frame member 31 extends between the longitudinal frame members 27 and 28 adjacent to and spaced from the transverse frame member 29. All of the above-mentioned frame members of the carriage 26 are generally channel-shaped in cross-section.

The transverse frame member 30 has connected thereto a pair of diagonal braces 32 which, in turn, have their opposite ends connected to the longitudinal frame members 27 and 28 at the intersections between the transverse frame member 21 and the longitudinal frame members 27 and 28. The connections between the longitudinal frame members 27 and 28 and the transverse frame member 30 are reinforced by gussets 33. A plate 43 reinforces the connections between the braces 32 and the transverse frame member 30. Elongated plates 35 and 36 overlie the connections of the transverse frame members 29 and 31 and the braces 32 with the longitudinal frame members 27.

As is best illustrated in FIGURE 6, the longitudinal frame members 27 and 28 carry wheels 37 which are disposed within the frame rails 19 and 20 and serve to support the carriage 26 for longitudinal movement along the frame 18. The movement of the carriage 26 is from left to right and return, as viewed in FIGURE 2.

An electric motor 38 having connected thereto as part thereof a gear reduction unit 39, is mounted on the plate 22. The gear reduction unit 39 is coupled by means of a coupling 40 to a further gear reduction unit 41. The gear reduction unit 41 has an output shaft 42 to which there is connected a clutch 43 and a drive sprocket 44.

A shaft mounting bracket 45 is supported by the support 24 intermediate the frame rails 19 and 20. The shaft mounting bracket 45 supports a shaft 46 which carries a driven sprocket 47. The sprocket 47 is aligned with the sprocket 44 and a drive chain 48 is entrained over the sprockets 44 and 47.

A bracket 49 is mounted on the plate 22 adjacent the clutch 43. The bracket 49 carries an idler sprocket 50 which is vertically adjustable for the purpose of tensioning the drive chain 48.

A crank 51 is secured to one end of the shaft 46. The crank 51 has a connecting rod 52 connected at one end thereof at 53, and the opposite end of the crank 51 is provided with a counterweight 54. The opposite end of the connecting rod 52 is connected, as at 55, to a rod 56 which is secured to the plate 34 through a fitting 57. Thus, as the shaft 46 rotates, it drives the crank 51 which, through the connecting rod 52, reciprocates the carriage 26.

At this time, it is pointed out that the motor 38 will run continuously during the operation of the invention, but that the rotation of the shaft 46 will be cycled. This is accomplished through the clutch 43 which is of a conventional type and which normally permits rotation of the shaft 42 while permitting the drive sprocket 44 to remain stationary. The clutch 43 is of the type which is locked against rotation by a pin, such as the pin 58, which, when temporarily withdrawn, will permit the rotation of the clutch 43 and the drive sprocket 44. The pin 58 is only momentarily withdrawn and will fall back into its associated opening after the clutch 43 and the drive sprocket 44 have made one complete revolution. The pin 58 is carried by a fitting 59 on a piston rod 60 of a quick acting fluid cylinder 61. The manner in which the cylinder 61 is operated will be described in detail hereinafter.

The transverse frame members 29 and 31 of the carriage 26 are provided adjacent their ends, both on the top and bottom sides thereof, with rail sections 62. The rail sections 62 are engaged by flanged wheels 63 of a second carriage, generally referred to by the numeral 64.

As is best illustrated in FIGURE 5, the second carriage 64 includes an elongated frame member 65 which extends transversely of the carriage 26. The frame member 65 has reduced and vertically offset end portions 66 which support the flanged wheels 63. Thus, the carriage 64 is mounted for reciprocatory movement transversely of the carriage 26.

The transverse reciprocatory movement of the carriage 64 is accomplished through an elongated guide, generally referred to by the numeral 67. The guide 67 is of an inverted channel shape in cross-section, as is best illustrated in FIGURE 6, and includes first and second legs 68 and 69 disposed in offset parallel relation, and an intermediate leg 70 which extends between and connects together the legs 68 and 69. A follower 71 projects upwardly from the carriage 64 and is engaged in the guide 67.

A transverse support member 72 extends between the frame rails 19 and 20 adjacent the transverse frame member 21. A second transverse support member 73 extends from the frame rail 20 in cantilever relation. It is to be noted that the guide 67 is secured to the undersides of the support members 72 and 73. It is also to be noted that the guide 67 is positioned with respect to the single line conveyor 11 so that the diagonal intermediate portion 70 thereof is in overlying relation with respect to the single line conveyor 11. Thus, when the carriage 26 is reciprocated, the carriage 64 will initially move with the carriage 26 in a straight line. As the carriage 64 approaches the single line conveyor 11, the follower 71 thereof will engage the diagonal leg 70 and will then move diagonally in the general direction of movement of the single line conveyor 11. After the carriage 64 has generally passed across the single line conveyor 11, the follower 71 will enter into the straight leg 69 and the carriage 64 will then continue in the same direction as the carriage 26.

Referring now to FIGURES 5 and 6 in particular, it will be seen that the central portion of the carriage 64 is in the form of a vertically disposed fluid cylinder, generally refererd to by the numeral 73'. The fluid cylinder 73' includes a cylinder 74 which is suitably mounted in an inverted position with respect to the remainder of the carriage 64. An elongated piston rod 75 extends from the lower end of the cylinder 74. The fluid cylinder 73' is of a conventional variable stroke type. Thus, the movement of the piston rod 75 upon each actuation of the fluid cylinder 73' may be varied.

A cross-head 76 is secured to the lower part of the cylinder 74. The outer ends of the cross-head 76 are in the form of sleeves 77 which receive lower portions of tubes 78, the upper ends of the tubes 78 being suitably secured to the underside of the carriage 64. The tubes 78 are guide tubes and have received therein vertically disposed guide rods 79.

Figure 9:
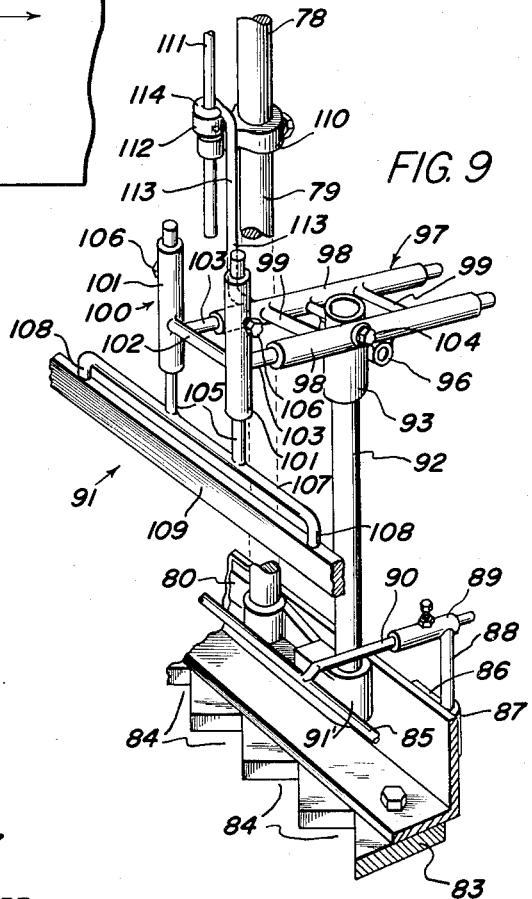
FIGURE 9 is an enlarged fragmentary perspective view showing the details of the mounting of the upper stabilizer.
Figure 10:
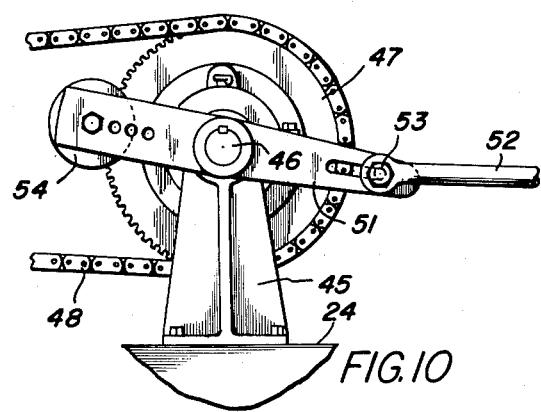
FIGURE 10 is an enlarged fragmentary elevational view showing the details of the crank assembly for reciprocating the first or main carriage of the article transferring apparatus.

An elongated foot member 80 is secured to the lower end of the piston 75 and the guide rod 79 for vertical movement therewith. An elongated angle mounting member 81 is secured to the foot member 80, as by fasteners 82. A pusher or article engaging member 83 is secured to the underside of a horizontal flange of the angle mounting member 81. As is best illustrated in FIGURE 9, the article engaging member 83 is of a sawtooth construction on the forward edge thereof to define a plurality of individual pockets 84. The pockets 84 are spaced apart equal to the spacing of the articles 15 as they move along the single line conveyor 11.

When the article engaging member 83 engages articles, such as relatively tall bottles, there is a tendency for the bottle to initially tip rearwardly. This is prevented by providing an elongated stabilizer 85 which is in the form of a horizontal rod disposed immediately rearwardly of the position of the article at the time of the engagement of the article by the article engaging member 83. In order to support the stabilizer 85, the vertical flange of the angle mounting member 81 is provided with a plurality of spaced fittings 86 which include upright sleeve portions 87. Support rods 88 are carried by the sleeve portions 87 and are vertically adjustable. Horizontal sleeve-type fittings 89 are secured to the upper ends of the support rods 88, and horizontal support rods 90 extend from the stabilizer 85 through the sleeves 89 to adjust the stabilizer 85 longitudinally of the movement of the article engaging member 83.

When a relatively tall article is being transferred, such as the tall bottle of FIGURE 7, there is also a tendency for the bottle to tilt forwardly. Forward tilting of such an article 15 is prevented by a pair of stabilizer assemblies, each of the stabilizer assemblies being generally referred to by the numeral 91. Since the two stabilizer assemblies 91 are identical, only one will be described in detail here.

The extreme end portions of the foot member 80 are provided with upstanding sockets 91' in which the lower ends of upstanding supports 92 are positioned. A mounting sleeve 93 is adjustably secured on the upper end of each standard 92 by means of a lock screw 94. A horizontal sleeve 95 is secured to the rear of the sleeve 93. The horizontal sleeve 95, in turn, carries a horizontal pivot shaft 96 on which a support bracket, generally referred to by the numeral 97, is pivotally mounted.

As is best illustrated in FIGURE 9, the mounting bracket 97 includes two elongated sleeves 98 which are disposed in parallel relation and which are connected together by a pair of transverse rods 99. The pivot rod 96 is also connected to the sleeve 98 intermediate the transverse rods 99.

A second mounting bracket, generally referred to by the numeral 100, is adjustably carried by the mounting bracket 97. The mounting bracket 100 includes a pair of generally vertically disposed sleeves 101 which are connected together by a transverse rod 102. Mounting rods 103 extend rearwardly from the sleeves 101. The mounting rods 103 are telescoped within the sleeves 98 and are secured in adjusted positions relative thereto by setscrews 104 carried by the sleeves 98. In this manner, the mounting bracket 100 may be adjusted longitudinally of the direction of movement of the article engaging member 83.

A pair of rods 105 extend down from the sleeves 101, the upper ends of the rods 105 being telescoped within the sleeves 101 and the rods 105 being vertically adjustably positioned relative to the sleeves 101 by means of setscrews 106 carried by the sleeves 101. The lower ends of the rods 105 are connected to an elongated support rod 107 which has downturned ends 108, the ends 108 being connected to a horizontally disposed stabilizer bar 109.

It is to be understood that the stabilizer assemblies 91 will be vertically movable with the article engaging members 83. Since the stabilizer bars 109 will be disposed forwardly of the articles 15 when the stabilizer bars 109 are in their operative positions, the stabilizer bars 109 are moved to out-of-the-way positions by tilting the mounting bracket 97 about the pivot rod 96. It is desired that shortly after the article engaging member 83 engages the articles 15, the stabilizer bars 109 be lowered into place, and that the stabilizer bars 109 remain in place during the rest of the article transferring operation. To this end, a guide bracket 110 is mounted on the lower end of the guide sleeve 78 adjacent to the stabilizer assembly 91. An elongated rod 111 has its lower portion guidedly engaged with the guide bracket 110. The lower portion of the rod 111 also carries a stop collar 112. A link member 113 is connected to the mounting bracket 97 forwardly of the pivot rod 96. The upper end of the link member 113 is in the form of a horizontally disposed eye 114 through which the rod 111 passes. The eye 114 is disposed above the collar 112, and downward movement of the link member 113 is limited by engagement of the eye 114 with the collar 112.

Reference is now made to FIGURE 5 in particular, wherein it is shown that each end of the carriage 64 is provided with a mounting bracket 115 which supports a horizontally disposed sleeve 116. A crank 117 has an intermediate portion thereof journaled in the sleeve 116. The crank 117 is provided with a pair of arms 118 and 119. The arm 118 is pivotally connected to the upper end of the rod 111, as at 120. The arm 119 carries a follower 121 which engages a cam 122 which is adjustably secured to the transverse frame member 29 by means of a mounting bracket 123, as is best shown in FIGURE 6.

At the beginning of an operational step of the invention, the article engaging member 83 will be in a lowered position, such as that illustrated in FIGURE 7, and the rods 111 and their stop collars 112 will be in elevated positions due to the positions of the followers 121 on top of the cams 122. As the carriage 26 is reciprocated, and the carriage 64 is reciprocated transversely of the carriage 26, the followers 121, in their movement to the right, as viewed in FIGURE 5, will ride down off of the upper portions of the cams 122, with the result that the rods 111 will be lowered, thus lowering the stop collars 112. The downward movement of the stop collars 112 will permit the downward movement of the link members 113, with the resultant downward pivoting of the mounting bracket 97 from its upward sloping position of FIGURE 7 to a generally horizontal position, such as that illustrated in FIGURE 9. Thus, while the stabilizer bar 109 will initially clear the article 15 to be transferred upon engagement thereof by the article engaging member 83, during the continued engagement of the article engaging member with the article to be transferred and in the movement of the article across the single line conveyor 11, the stabilizer bars 109 will be lowered to their dotted line positions of FIGURE 7 and thus prevent forward tilting of the articles particularly when they engage the lehr conveyor 12 and are disengaged from the article engaging member 83.

Reference is now had to FIGURE 8 in particular. As mentioned above, the operation of the clutch 43 and the rotation of the drive sprocket 44 are controlled by a quick acting fluid motor 61. The fluid motor 61 is illustrated as including a cylinder 123' in which a piston 124 is mounted. The piston 124 is connected to a piston rod 60 which extends through both ends of the cylinder 123'. A mounting fitting 59 is carried by one end of the piston rod 60, the mounting fitting 59 carrying the pin 58. The piston rod 60 is urged to a pin engaging position by a spring 127 disposed within the cylinder 123' and bearing against the piston 124. An adjustable stop collar 128 is mounted on the end of the piston rod 60 remote from the mounting fitting 59 to limit the movement of the piston rod 60 due to the urging of the spring 127.

A fluid line 129 opens into the cylinder 123' intermediate the piston 124 and that end of the cylinder 123' remote from the spring 127. The opposite end of the fluid line 129 is connected to an air valve 130 which includes a cylinder 131 having an air inlet line 132 and an exhaust line 133 connected to opposite end portions thereof. A valve member 134 is disposed within the cylinder 131 and is urged to a position closing the outlet to the fluid line 129 by a spring 135. A stop ring 136 is positioned within the cylinder 131 to limit the movement of the valve member 134 due to the urging of the spring 135 to a position aligned with the connection of the fluid line 129 with the cylinder 131. The piston 134 is provided with an exhaust passage 137 which permits the exhausting of air from the cylinder 123'.

A valve rod 138 is secured to the valve member 134 and extends out through the lower end of the cylinder 131. The valve rod 138 is engaged with a cam 139 which is mounted on a shaft 140 suitably connected to the apparatus which positions the articles on the single line conveyor 11, the apparatus being in the form of a glass molding machine in the intended use of the invention. Assuming that thirteen of the articles 15 are to be transferred at a time, the shaft 140 is rotated in timed relation to the operation of the glass molding machine so that it is rotated one revolution for each thirteen of the articles 15 produced.

Referring now to FIGURES 2 and 3 in particular, it will be seen that the mounting bracket 141 is secured to the support 24 adjacent the end of the shaft 46 remote from that end to which the crank 51 is connected. The mounting bracket 141 supports an air control valve 142. The air control valve 142 includes an inlet line 143, an exhaust line 144 and a pair of lines 145 and 146 which are connected to the opposite ends of the cylinder 74 of the fluid cylinder 73', which is of the double acting type.

The valve 142 is provided with a horizontally shiftable control shaft 147 which projects from the right end thereof, as viewed in FIGURES 2 and 3.

A pair of levers 148 and 149 are pivotally mounted on the support 24 for swinging movement about horizontal axes, the levers 148 and 149 extending upright on opposite sides of the shaft 46. The levers 148 and 149 are interconnected by an adjustable link 150 so that the levers move in unison. The upper part of the lever 148 is provided with a follower 151 which engages the shaft 147 to control the position thereof. The follower 151 also includes a portion 152 which opposes the shaft 46. The lever 149 has a follower 153 which opposes the shaft 46. It is to be understood that the follower portion 152 and the follower portion 153 are offset longitudinally of the shaft 46.

A pair of cams 154 and 155 are carried by the shaft 46 adjacent each other. The cam 154 is aligned with the follower portion 152 and the cam 155 is aligned with the follower 153. The cam 154 cooperates with the lever 148 to move the shaft 147 to the left, and the cam 155 cooperates with the lever 149 to move the shaft 147 to the right.

*Operation*

In the operation of the invention, the article engaging member 83 will initially be positioned as illustrated in solid lines in FIGURE 3. When the required number of articles 15 are aligned with the article engaging member 83, the cam 139 will operate the valve 130 which, in turn, will operate the fluid cylinder 61 and thus operate the clutch 43. This results in the movement of the carriage 26 to the right, as viewed in FIGURES 2 and 3. The carriage 26 moves to the right, carrying the carriage 64 therewith, and the carriage 64 remains stationary with respect to the carriage 26 until such time as the articles 15 are disposed within the sockets 84 of the article engaging member 83. At this time, the follower 71 enters into the diagonal leg 70 of the guide 67 and, as a result, as the article engaging member 83 is continued to be moved transversely of the single line conveyor 11, the direction of movement shifts from a direction transversely of the conveyor 11 to a direction diagonally of the conveyor 11 generally in the direction of movement of the conveyor 11. By so moving, the article engaging member 83 clears the next article 15 passing along the conveyor 11.

After the article engaging member 83 has cleared the line of movement of the articles 15 along the conveyor 11, the follower 71 enters into the straight leg 69 of the guide 67 and the path of movement of the article engaging member 83 is generally longitudinally of the conveyor 12 and transversely of the conveyor 11. Immediately prior to the shifting of the direction of movement of the article engaging member 83 from a diagonal direction to its direction longitudinally of the conveyor 12, the shifting of the carriage 64 transversely of the carriage 26 has resulted in the operations of the stabilizer assemblies 91 to lower the stabilizer bars 109 into place.

The article engaging member 83 and the articles 15 engaged thereby continue to move longitudinally of the conveyor 12 until the carriage 26 reaches the end of its stroke. At this time, the valve 142 is operated to effect the operation of the fluid cylinder 73' and bring about the elevation of the article engaging member 83 so that it is elevated to a position above the tops of the articles 15. This is best shown in dotted lines in FIGURE 3. At the same time, the stabilizer bars 109 are elevated to sufficiently clear the articles 15 which have just been transferred by the article engaging member 83.

As the article engaging member 83 moves along its return stroke, it will move over the same course as it followed on its forward stroke. However, it will be elevated above its former course and will clear the next articles 15 which are being moved into position along the conveyor 11. At the end of its return stroke, the article engaging member 83 is lowered due to the tripping of the valve 142 and the operation of the fluid cylinder 73' to lower the article engaging member 83. This is the end of a cycle of operation.

It will be readily apparent that depending upon the height of the articles 15 being transferred, the amount which the article engaging member 83 must be elevated to clear the articles 15 will vary. For this reason, it is desirable that the fluid cylinder 73' be of the variable stroke type in order that the elevating of the article engaging member 83 may be held to a minimum in each instance and at the same time, the capacity of the transferring mechanism be relatively great as to the height of the articles to be transferred thereby.

From the foregoing, it will be seen that novel and advantageous provision has been made for carrying out the desired end. However, attention is directed to the fact that variations may be made in the example apparatus disclosed herein without departing from the spirit and scope of the invention, as defined in the appended claims.

We claim:
1. An article conveying system comprising a narrow single line conveyor, a relatively wide conveyor for conveying articles arranged in columns and rows, said single line conveyor being disposed generally normal to said wide conveyor at one end thereof, and article transfer means positioned adjacent said single line conveyor and generally in alignment with said wide conveyor for simultaneously transferring a plurality of articles from said single line conveyor to said wide conveyor, said article transfer means including an article engaging member, and means connected to said article engaging member for moving said article engaging member first transversely of said single line conveyor into engagement with articles thereon, then diagonally of and in the general direction of movement of said single line conveyor to clear a next following article on said single line conveyor until said single line conveyor is generally cleared, and then longitudinally of said wide conveyor.

2. An article conveying system comprising a narrow single line conveyor, a relatively wide conveyor for conveying articles arranged in columns and rows, said single line conveyor being disposed generally normal to said wide conveyor at one end thereof, and article transfer means positioned adjacent said single line conveyor and generally in alignment with said wide conveyor for simultaneously transferring a plurality of articles from said single line conveyor to said wide conveyor, said article transfer means including an article engaging member, and means connected to said article engaging member for moving said article engaging member on a feed stroke first transversely of said single line conveyor into engagement with articles thereon, then diagonally of and in the general direction of movement of said single line conveyor to clear a next following article on said single line conveyor, then longitudinally of said wide conveyor, and then upwardly at the end of the feed stroke to clear articles on the return stroke, and then downwardly to start the next feed stroke.

3. An article transferring apparatus for transferring a plurality of articles moving in a single file on one conveyor to a single transverse line position on a second conveyor, said article transferring apparatus comprising an article engaging pusher, support means for said pusher, and drive means connected to said pusher support means for first moving said pusher generally normal to the single file path of articles into engagement with a plurality of articles, then diagonally of the single file path and generally in the direction of movement of articles along the single file path to clear subsequent articles moving along the single file path, then again generally normal to the single file path to a position overlying the second conveyor, and then up back over the single file path and down to the initial position.

4. An article conveying system comprising a narrow single line conveyor, a relatively wide conveyor for conveying articles arranged in columns and rows, said single line conveyor being disposed generally normal to said wide conveyor at one end thereof, and article transfer means positioned adjacent said single line conveyor and generally in alignment with said wide conveyor for simultaneously transferring a plurality of articles from said single line conveyor to said wide conveyor, said article transfer means including an article engaging member, a frame overlying said conveyors, a guide supported by said frame, said guide having a pair of parallel legs connected together by an intermediate diagonal portion, a carriage supported from said frame and having a follower engaged with said guide to guide the movement of said carriage, drive means connected to said carriage for reciprocating said carriage generally longitudinally of said wide conveyor, a support for said article engaging member secured to said carriage, said guide legs being disposed generally longitudinally of said wide conveyor and said diagonal portion overlying said single line conveyor and sloping in the direction of movement of said single line conveyor, whereby said article engaging member when traversing said single line conveyor moves diagonally of and in the general direction of movement of said single line conveyor to clear a next following article on said single line conveyor.

5. An article conveying system comprising a narrow single line conveyor, a relatively wide conveyor for conveying articles arranged in columns and rows, said single line conveyor being disposed generally normal to said wide conveyor at one end thereof, and article transfer means positioned adjacent said single line conveyor and generally in alignment with said wide conveyor for simultaneously transferring a plurality of articles from said single line conveyor to said wide conveyor, said article transfer means including an article engaging member, a frame overlying said conveyors, a guide supported by said frame, said guide having a pair of parallel legs connected together by an intermediate diagonal portion, a carriage supported from said frame and having a follower engaged with said guide to guide the movement of said carriage, drive means connected to said carriage for reciprocating said carriage generally longitudinally of said wide conveyor, a support for said article engaging member secured to said carriage, said guide legs being disposed generally longitudinally of said wide conveyor and said diagonal portion overlying said single line conveyor and sloping in the direction of movement of said single line conveyor, whereby said article engaging member when traversing said single line conveyor moves diagonally of and in the general direction of movement of said single line conveyor to clear a next following article on said single line conveyor, said support being in the form of a fluid cylinder having a vertically movable piston rod, and valve means controlling the operation of said fluid cylinder in timed relation to the movement of said carriage.

6. The article conveying system of claim 5 wherein said valve means are operated by said drive means.

7. An article conveying system comprising a narrow single line conveyor, a relatively wide conveyor for conveying articles arranged in columns and rows, said single line conveyor being disposed generally normal to said wide conveyor at one end thereof, and article transfer means for simultaneously transferring a plurality of articles from said single line conveyor to said wide conveyor in a row, said article transfer means including a frame overlying said single line conveyor and said wide conveyor, first tracks on said frame extending longitudinally of said wide conveyor, a first carriage mounted on said first tracks for reciprocatory movement, second tracks mounted on said first carriage and extending generally longitudinally of said single line conveyor, a second carriage mounted on said second tracks for reciprocatory movement, a support depending from said second carriage, an article engaging member carried by said support, drive means connected to said first carriage for reciprocating said first carriage, and guide measn connected to said second carriage for reciprocating said second carriage relative to said first carriage, whereby said article engaging member is moved generally longitudinally of said wide conveyor and when traversing said single line conveyor moves diagonally of and in the general direction of movement of said single line conveyor to clear a next following article on said single line conveyor.

8. The article conveying system of claim 7 wherein said guide means includes a guide secured to said frame and a follower on said second carriage engaged with said guide, said guide having a pair of parallel offset legs connected together by a diagonal intermediate portion, said intermediate portion overlying said single line conveyor.

9. The article conveyor of claim 7 wherein said support is in the form of a vertically disposed fluid cylinder, and said fluid cylinder is provided with valve means controlling the operation thereof in timed relation to the operation of said drive means to elevate said article engaging member on the back stroke of said first carriage to clear articles on said single line conveyor.

10. The article conveying system of claim 9 wherein said valve means are operated by said drive means.

11. The article conveying system of claim 7 wherein said drive means includes a continuously operating power unit and a clutch unit, means connected to said clutch unit for operating said clutch unit in timed relation to movement of articles along said single line conveyor.

12. The article conveying system of claim 7 wherein said single line conveyor leads from a glass article molding machine, said wide conveyor is a lehr conveyor leading into a lehr oven, and said frame is mounted on said lehr oven.

13. An article conveying system comprising a narrow single line conveyor, a relatively wide conveyor for conveying articles arranged in columns and rows, said single line conveyor being disposed generally normal to said wide conveyor at one end thereof, and article transfer means for simultaneously transferring a plurality of articles from said single line conveyor to said wide conveyor in a row, said article transfer means including a frame overlying said single line conveyor and said wide conveyor, first tracks on said frame extending longitudinally of said wide conveyor, a first carriage mounted on said first tracks for reciprocatory movement, second tracks mounted on said first carriage and extending generally longitudinally of said single line conveyor, a second carriage mounted on said second tracks for reciprocatory movement, a support depending from said second carriage, an article engaging member carried by said support, drive means connected to said first carriage for reciprocating said first carriage, guide means connected to said second carriage for reciprocating said second carriage relative to said first carriage, whereby said article engaging member is moved generally longitudinally of said wide conveyor and when traversing said single line conveyor moves diagonally of and in the general direction of movement of said single line conveyor to clear a next following article on said single line conveyor, and an article stabilizing means cooperating with said article engaging member to prevent the tipping over of articles while being transferred from said single line conveyor to said wide conveyor.

14. The article conveying system of claim 13 wherein said article stabilizing means are provided with a cam and a follower for effecting the operation thereof, said cam being adjustably mounted on said first carriage and said last mentioned follower being mounted on said second carriage.

15. The article conveying system of claim 13 wherein said article stabilizing means are supported primarily by said support for movement therewith.

16. The article conveying system of claim 5 wherein said fluid cylinder is of the variable stroke type.

17. An article conveying system comprising a narrow single line conveyor, a relatively wide conveyor for conveying articles arranged in columns and rows, said single line conveyor being disposed generally normal to said wide conveyor at one end thereof, and article transfer means for simultaneously transferring a plurality of articles from said single line conveyor to said wide conveyor in a row, said article transfer means including a frame overlying said single line conveyor and said wide conveyor, first tracks on said frame extending longitudinally of said wide conveyor, a first carriage mounted on said first tracks for reciprocatory movement, second tracks mounted on said first carriage and extending generally longitudinally of said single line conveyor, a second carriage mounted on said second tracks for reciprocatory movement, a support depending from said second carriage, an article engaging member carried by said support, drive means connected to said first carriage for reciprocating said first carriage, guide means connected to said second carriage for reciprocating said second carriage relative to said first carriage, whereby said article engaging member is moved generally longitudinally of said wide conveyor and when traversing said single line conveyor moves diagonally of and in the general direction of movement of said single line conveyor to clear a next following article on said single line conveyor, and an article stabilizing means cooperating with said article engaging member to prevent the tipping over of articles while being transferred from said single line conveyor to said wide conveyor, a first article stabilizing means carried by said support and engageable with rear portions of articles engaged by said article engaging member for preventing rearward tipping of such articles, and second article stabilizing means disposed above said first article stabilizing means and forwardly thereof to engage upper forward portions of the articles and prevent forward tipping thereof.

18. The article conveying system of claim 17 wherein said second article stabilizing means includes a pivotally mounted stabilizer member and means for automatically swinging said stabilizing member in timed relation to the movement of said article engaging member.

19. In an article transfer mechanism wherein an article being transferred is shifted in directions having both longitudinal and transverse components, an article engaging member, a first carriage, means mounting said first carriage for longitudinal movement, a second carriage, means carried by said first carriage mounting said second carriage for transverse movement relative to said first carriage and longitudinal movement with said first carriage, fixed guide means connected to said second carriage for imparting transverse movement to said second carriage in response to longitudinal movement of said first and second carriages whereby said second carriage moves diagonally as said first carriage moves longitudinally, means for effecting reciprocation of said first carriage, and means connecting said article engaging member to said second carriage.

20. In an article transfer mechanism wherein an article being transferred is shifted in directions having both longitudinal and transverse components, an article engaging member, a first carriage, means mounting said first carriage for longitudinal movement, a second carriage, means carried by said first carriage mounting said second carriage for transverse movement relative to said first carriage and longitudinal movement with said first carriage, fixed guide means connected to said second carriage for imparting transverse movement to said second carriage in response to longitudinal movement of said first and second carriages whereby said second carriage moves diagonally as said first carriage moves longitudinally, means for effecting reciprocation of said first carriage, and means connecting said article engaging member to said second carriage, the last mentioned means being vertically extensible, and means actuated by said first carriage controlling the extension and retraction of said last mentioned means to raise and lower said article engaging member in timed relation to the reciprocation thereof.

References Cited in the file of this patent

UNITED STATES PATENTS

| | | |
|---|---|---|
| 1,618,660 | Howard | Feb. 22, 1927 |
| 1,760,030 | Alger | May 27, 1930 |
| 1,832,344 | Wittman | Nov. 17, 1931 |
| 1,869,767 | Nagle | Aug. 2, 1932 |
| 1,983,593 | Beeson | Dec. 11, 1934 |
| 2,094,497 | Ross | Sept. 28, 1937 |
| 2,135,986 | Morton | Nov. 8, 1938 |